(12) United States Patent
Wang

(10) Patent No.: US 10,809,906 B2
(45) Date of Patent: Oct. 20, 2020

(54) ELECTRONIC DEVICE AND SCREENSHOT CAPTURING METHOD

(71) Applicant: Chiun Mai Communication Systems, Inc., New Taipei (TW)

(72) Inventor: Yueh-Chi Wang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/527,126

(22) Filed: Jul. 31, 2019

(65) Prior Publication Data
US 2020/0050349 A1    Feb. 13, 2020

(30) Foreign Application Priority Data

Aug. 7, 2018    (CN) .......................... 2018 1 0893393

(51) Int. Cl.
*G06F 3/0484* (2013.01)
*G06F 3/0481* (2013.01)
*G06F 3/0488* (2013.01)

(52) U.S. Cl.
CPC ...... *G06F 3/04847* (2013.01); *G06F 3/04817* (2013.01); *G06F 3/04883* (2013.01); *G06F 3/04886* (2013.01)

(58) Field of Classification Search
CPC .......................................... G06F 3/048–04886
See application file for complete search history.

(56) References Cited

U.S. PATENT DOCUMENTS

| | | | | |
|---|---|---|---|---|
| 2007/0162865 A1* | 7/2007 | Haynes | ................. | G06F 3/0481 715/769 |
| 2011/0221766 A1* | 9/2011 | Ko | ........................ | G06F 3/1225 345/629 |
| 2012/0060084 A1* | 3/2012 | Takada | .................. | G06F 3/1256 715/234 |
| 2012/0302167 A1* | 11/2012 | Yun | ....................... | G06F 3/0416 455/41.2 |
| 2014/0173482 A1* | 6/2014 | Hicks | .................. | G06F 3/04883 715/769 |

(Continued)

FOREIGN PATENT DOCUMENTS

| | | |
|---|---|---|
| CN | 105739773 A | 7/2016 |
| CN | 107145293 A | 9/2017 |

OTHER PUBLICATIONS

TechSmith. (Mar 2013). Snagit 11.2 Help. Retrieved Mar. 20, 2020 from https://assets.techsmith.com/Docs/pdf-snagit/Snagit_11.2_Help_File.pdf. (Year: 2013).*

*Primary Examiner* — Matthew Ell
*Assistant Examiner* — Linda Huynh
(74) *Attorney, Agent, or Firm* — ScienBiziP, P.C.

(57) ABSTRACT

A method for capturing display data on a screen together with display data not currently visible is applied to an electronic device. The method displays a user interface of an application on a touch screen of the electronic device, the user interface being divided into a sliding area and N number of non-sliding areas, when a preset user operation is applied to the electronic device. The method sets a starting position and an ending position in the sliding area. Content between the set starting and ending positions is read, and a screenshot corresponding to the read content is generated.

17 Claims, 10 Drawing Sheets

(56) References Cited

U.S. PATENT DOCUMENTS

2015/0007024 A1* 1/2015 Jeong .................... G06F 40/106
                                                    715/277
2016/0058279 A1* 3/2016 Torres ...................... A61B 3/14
                                                    351/206
2016/0266757 A1* 9/2016 Ye ......................... G06F 3/0488
2017/0102836 A1* 4/2017 Yoon .................... H04W 88/02
2018/0046341 A1* 2/2018 Lee ..................... G06F 3/04817

* cited by examiner

ELECTRONIC DEVICE AND SCREENSHOT CAPTURING METHOD

CROSS-REFERENCE TO RELATED APPLICATIONS

This application claims priority to CN Application No. 201810893393.1 filed on Aug. 7, 2018, the contents of which are incorporated by reference herein.

FIELD

The subject matter herein generally relates to managing technology, and particularly to an electronic device and a screenshot capturing method.

BACKGROUND

An electronic device such as a mobile phone can only display limited content. Therefore, when a user wants to capture the content currently displayed on a screen of the mobile phone and other content that is not currently displayed, the user needs to perform multiple screenshot capturing operations to capture those contents.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
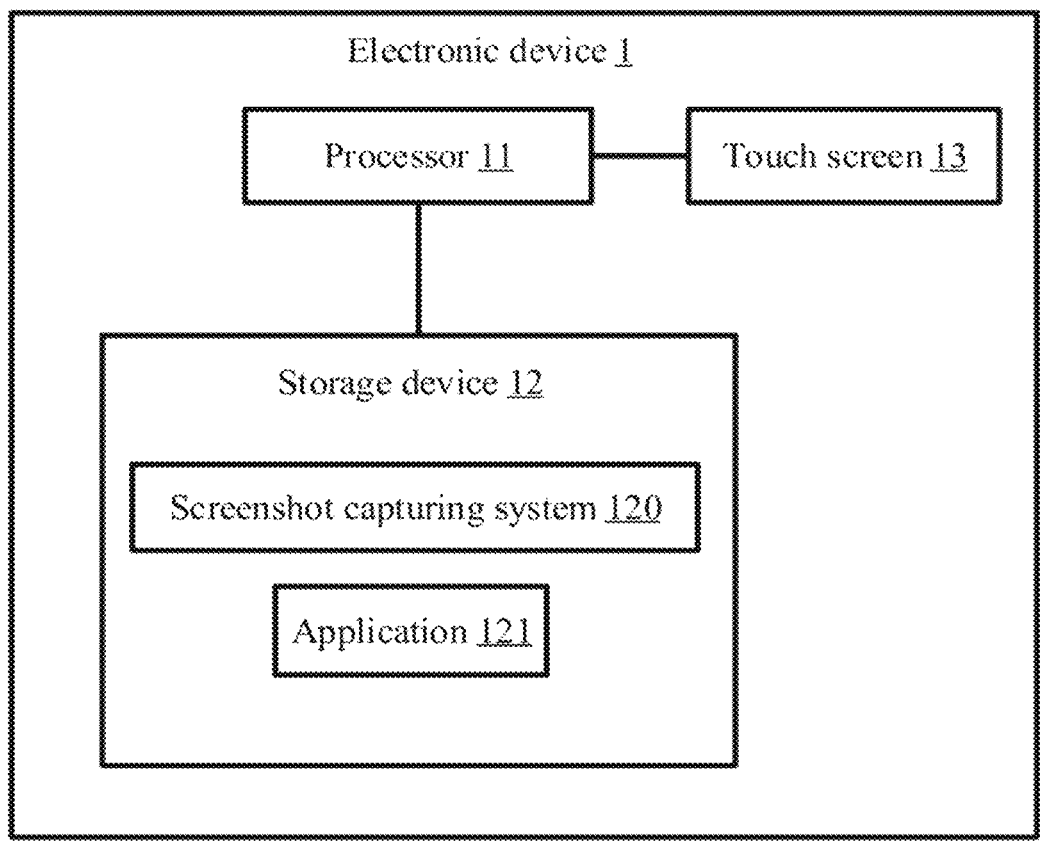
FIG. 1 is a block diagram of an exemplary embodiment of an electronic device including a screenshot capturing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates an exemplary embodiment of an electronic device including a screenshot capturing system. Depending on the embodiment, electronic device 1 can be a games machine, a mobile phone, a tablet computer, or any other device having a display function. In at least one exemplary embodiment, the electronic device 1 can include, but is not limited to, at least one processor 11, a storage device 12, and a touch screen 13. The above components are electrically connected with each other.

In at least one exemplary embodiment, the at least one processor 11 may be composed of an integrated circuit, for example, may be composed of a single packaged integrated circuit, or may be composed of multiple integrated circuits having same function or different functions. The at least one processor 11 can include one or more central processing units (CPU), a microprocessor, a digital processing chip, a graphics processor, and various control chips. The at least one processor 11 is a control unit of the electronic device 1, which connects various components of the electronic device 1 using various interfaces and lines. By running or executing a computer program or modules stored in the storage device 12, and by invoking data stored in the storage device 12, the at least one processor 11 can perform functions of the electronic device 1 and process data of the electronic device 1. For example, the at least one processor 11 can execute a screenshot capturing system 120 stored in the storage device 12 so as to capture content displayed on the touch screen 13 and content which is not displayed on the touch screen 13.

In at least one exemplary embodiment, the storage device 12 can be used to store program codes of computer programs and various data, such as the screenshot capturing system 120 and one or more applications 121 installed in the electronic device 1. The storage device 12 can automatically access the computer programs or data. The storage device 12 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-transitory storage medium readable by the electronic device 1 that can be used to carry or store data.

Figure 2:
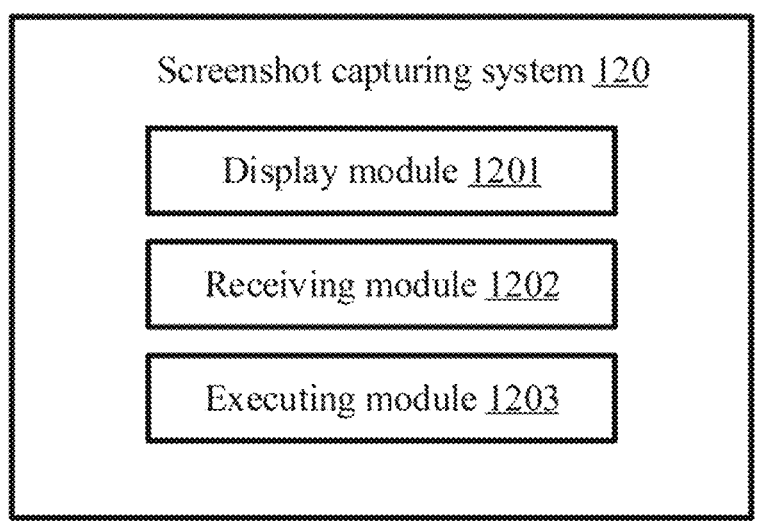
FIG. 2 is a block diagram of an exemplary embodiment of modules of the screenshot capturing system included in the electronic device of FIG. 1.

In at least one exemplary embodiment, the touch screen 13 can be a screen that supports touch operations, or can be a screen that supports 3D-touch operations. In at least one exemplary embodiment, the screenshot capturing system 120 can include a plurality of modules. As shown in FIG. 2, the plurality of modules can include, but is not limited to, a display module 1201, a receiving module 1202, and an executing module 1203. The modules 1201-1203 can include computerized instructions in a form of one or more computer-readable programs that can be stored in a non-transitory computer-readable medium (e.g., the storage device 12 of the electronic device 1), and executed by the at least one processor 11 of the electronic device 1 to implement screenshot capturing function described in FIG. 3.

Figure 3:
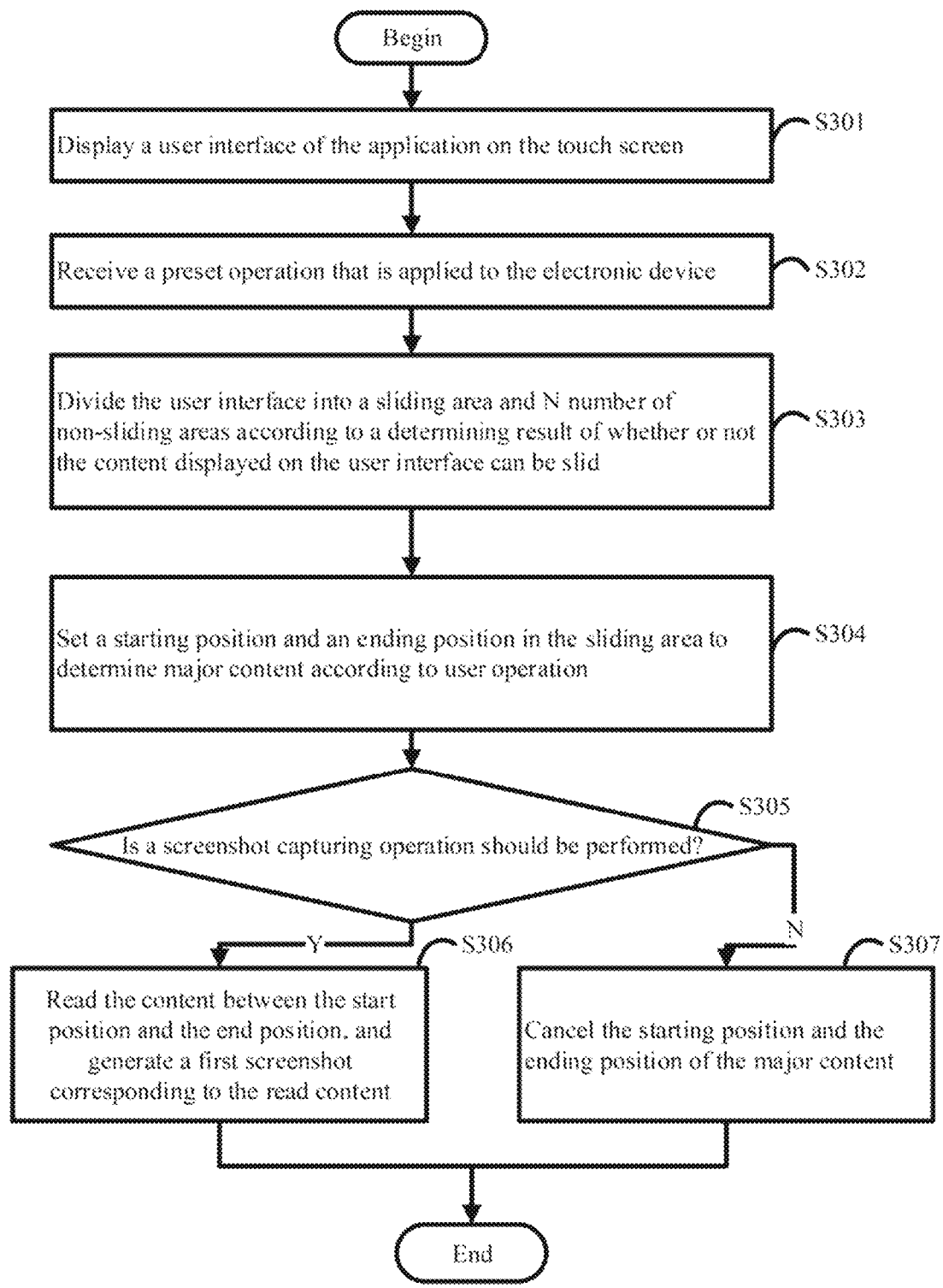
FIG. 3 is a flowchart of an exemplary embodiment of a method for capturing display on a screen.

FIG. 3 illustrates a flowchart of an exemplary method of a screenshot capture. In an example embodiment, the method is performed by execution of computer-readable software program codes or instructions by the at least one processor 11 of the electronic device 1.

Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S301.

At block S301, when the electronic device 1 executes the application 121, the display module 1201 can display a user interface 141 of the application 121 on the touch screen 13.

In at least one exemplary embodiment, the application 121 can be a software program that can provide the user interface 141 to interact with a user of the electronic device 1.

In at least one exemplary embodiment, the application 121 can be an instant communication system (e.g., QQ, WeChat), browser, or any other suitable application.

Figure 4:
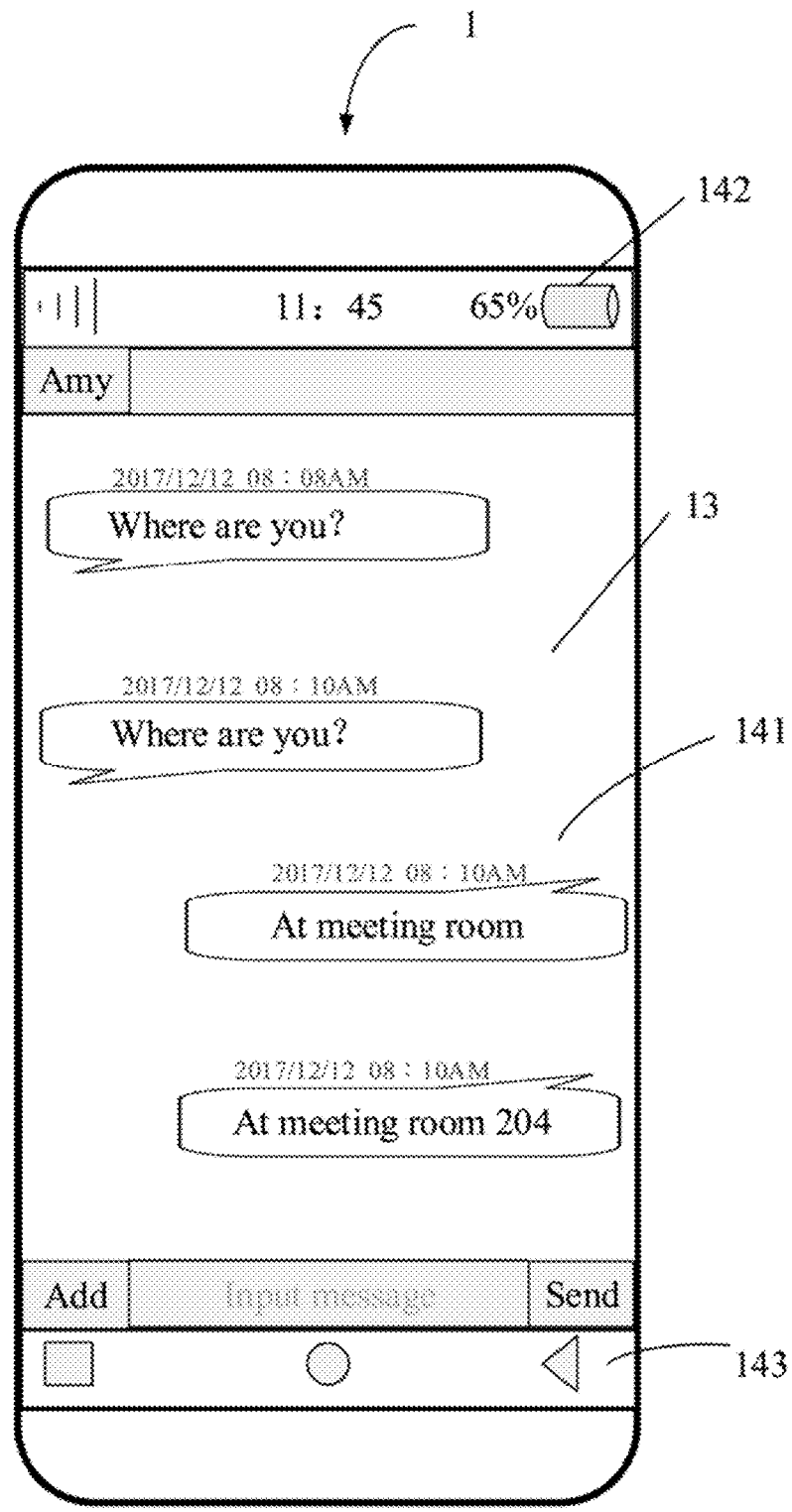
FIG. 4 illustrates an exemplary embodiment of the display of a user interface of an application together with other contents on a touch screen of the electronic device of FIG. 1.

In at least one exemplary embodiment, as shown in FIG. 4, the display module 1201 can display other contents on the touch screen 13. The other contents can include, but is not limited to, a status bar 142 and a navigation bar 143.

The status bar 142 can be a bar that is used to display time, remaining battery power, network signal strength, and the like. The status bar 142 can be located at a top of the touch screen 13. Generally, the electronic device 1 such as a mobile phone includes the status bar 142.

The navigation bar 143 is a bar for providing navigation buttons such as a "back button", a "home Button", and a "recent button", so that the user can operate the navigation buttons to access different pages of the application 121, link to different sites, and the like. The navigation bar 143 can be located at a lowermost end of the touch screen 13. The navigation bar 143 is a virtual bar.

At block S302, the receiving module 1202 can receive a preset operation applied to the electronic device 1.

In at least one exemplary embodiment, the preset operation can be a touch operation applied to the touch screen 13. In other exemplary embodiments, the preset operation can be a combination of the touch operation and an operation of pressing a specified physical button of the electronic device 1, wherein the touch operation and the operation of pressing the specified physical button are performed at a same time.

In at least one exemplary embodiment, the touch operation can be an operation of at least one finger sliding on the touch screen 13, or an operation of two or more fingers simultaneously moving on the touch screen 13 to bring the two or more fingers closer to or away from each other.

In at least one exemplary embodiment, the specified physical button can include, but is not limited to, a power button, a volume up button, a volume down button of the electronic device 1, and/or a combination thereof.

At block S303, when the preset operation is received by the receiving module 1202, the executing module 1203 can divide the user interface 141 into a sliding area and N number of non-sliding areas according to a result of determining whether or not the content displayed on the user interface 141 can be slid. In at least one exemplary embodiment, the sliding area is an area of the user interface 141 which is corresponding to the content that can be slid, and the non-sliding area is an area of the user interface 141 which is corresponding to the content that cannot be slid. In at least one exemplary embodiment, the number N varies depending on the application 121. N is an integer greater than or equal to zero.

Figure 5A:
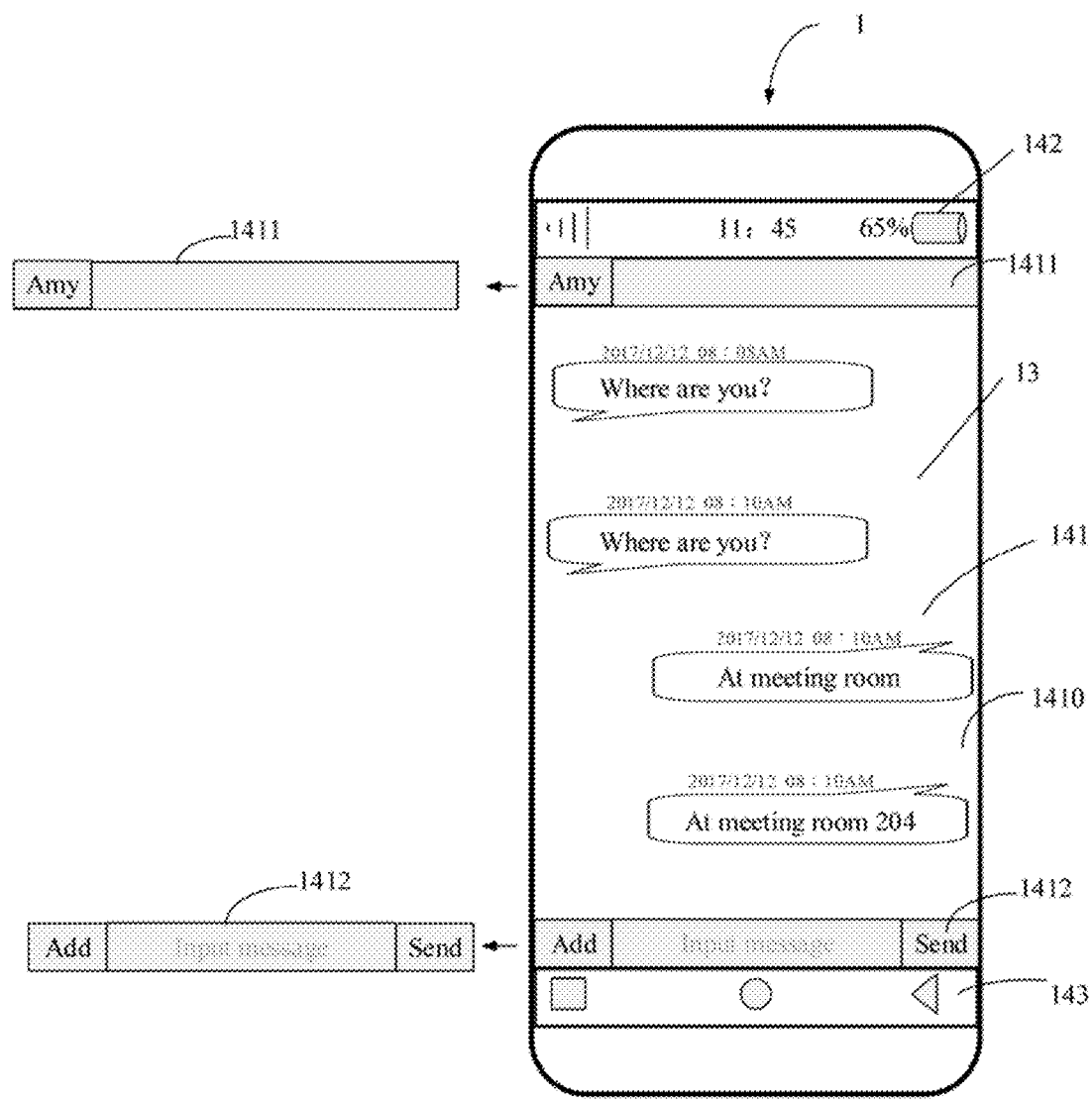
FIG. 5A illustrates an exemplary embodiment of the division of the user interface into a sliding area and two non-sliding areas.

For example, as shown in FIG. 5A, the executing module 1203 can divide the user interface 141 into one sliding area 1410 and two non-sliding areas 1411, 1412.

FIG. 5A shows the two non-sliding areas 1411, 1412 on a left side of the electronic device 1. This is to make clear for those skilled in the art to understand how the executing module 1203 divides the user interface 141 into one sliding area and N number of non-sliding areas.

At block S304, the executing module 1203 can set a starting position and an ending position in the sliding area to determine major content, according to user operation.

The major content can be defined as contents in the sliding area that is to be captured. Content/material not in the sliding area that is to be captured is named as additional content. Accordingly, the content between the starting position and the ending position in the sliding area is the major content. In other words, the executing module 1203 determines the major content using the starting position and the ending position.

In at least one exemplary embodiment, the additional content can include at least one of the N number of non-sliding areas (e.g., 1411 and 1412), the status bar 142, the navigation bar 143, or a combination thereof.

In at least one exemplary embodiment, when the preset operation is received by the receiving module 1202, the executing module 1203 can display two icons for the sliding area. The two icons include a starting icon for setting the starting position in the sliding area, and an ending icon for setting the ending position in the sliding area.

The executing module 1203 can display N number of icons for the N number of non-sliding areas, each icon corresponds to one non-sliding area. Each icon corresponding to a non-sliding area can be used to determine whether the corresponding non-sliding area should be set as the additional content. The executing module 1203 can display an icon for the status bar 142, and display an icon for the navigation bar 143. The icon corresponding to the status bar 142 can be used to determine whether the status bar 142 should be set as the additional content. The icon corresponding to the navigation bar 143 can be used to determine whether the navigation bar 143 should be set as the additional content.

Figure 5B:
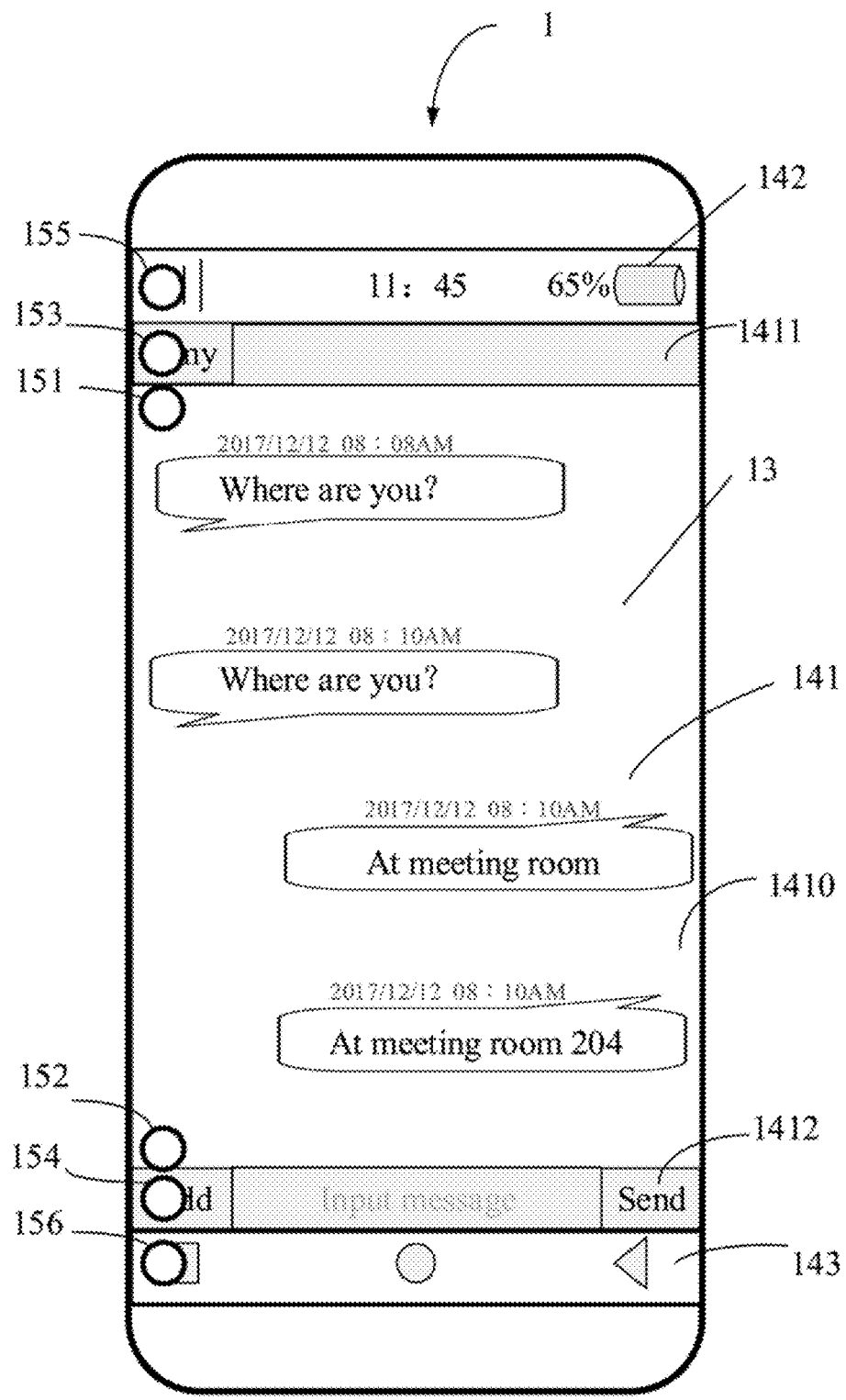
FIG. 5B illustrates an exemplary embodiment of the display of icons for different areas.

For example, as shown in FIG. 5B, the executing module 1203 can display a first icon 151 and a second icon 152 for the sliding area 1410. The first icon 151 (i.e., the starting icon) is used to set the starting position, and the second icon 152 (i.e., the ending icon) is used to set the ending position. The executing module 1203 can display a third icon 153 for the non-sliding are 1411 and a fourth icon 154 for the non-sliding area 1412. The executing module 1203 can display a fifth icon 155 for the status bar 142, and can display a sixth icon 156 for the navigation bar 143. The third icon 153 is used to determine whether the non-sliding area 1411 should be set as the additional content. The fourth icon 154 is used to determine whether the non-sliding area 1412 should be set as the additional content. The fifth icon 155 can be used to determine whether the status bar 142 should be set as the additional content. The sixth icon 156 can be used to determine whether the navigation bar 143 should be set as the additional content.

In at least one exemplary embodiment, when the executing module 1203 receives a signal that is generated by clicking the first icon 151, the executing module 1203 can set an upper boundary of the sliding area 1410 as the starting position. When the executing module 1203 receives a signal that is generated by clicking the second icon 152, the executing module 1203 can set a lower boundary of the sliding area 1410 as the ending position. Therefore, the executing module 1203 determines that the content between the starting position and the ending position is the major content. In at least one exemplary embodiment, when the executing module 1203 receives a signal that is generated by clicking the third icon 153, the executing module 1203 can set the non-sliding area 1411 as the additional content. When the executing module 1203 receives a signal that is generated by clicking the fourth icon 154, the executing module 1203 can set the non-sliding area 1412 as the additional content. When the executing module 1203 receives a signal that is generated by clicking the fifth icon 155, the executing module 1203 can set the status bar 142 as the additional content. When the executing module 1203 receives a signal that is generated by clicking the sixth icon 156, the executing module 1203 can set the navigation bar 143 as the additional content.

In at least one exemplary embodiment, when any one of the icons (i.e., the first icon 151, the second icon 152, the third icon 153, the fourth icon 154, the fifth icon 155, and the sixth icon 156) is clicked by the user, the executing module 1203 can mark the clicked icon. The marking can be displaying the clicked icon with a first preset color (e.g., blue color).

In at least one exemplary embodiment, the executing module 1203 can change the major content by resetting the starting position and the ending position.

In at least one exemplary embodiment, when the user performs a sliding operation, such as an operation of sliding upwards or an operation of sliding downwards in the sliding area 1410, the executing module 1203 can receive a sliding signal (such as a sliding signal with a direction of sliding upwards or a sliding signal with a direction of sliding downwards). Then the executing module 1203 can slide the content currently displayed in the sliding area 1410 according to the received sliding signal, so that new content can be visible, sliding out from an upper edge or a lower edge of the sliding area 1410 to the sliding area 1410. It should be noted that new content is defined to be content which is not currently displayed on the sliding area 1410, but sliding out from the upper or lower edge of the sliding area 1410 to accompany the sliding of the currently displayed content. In at least one exemplary embodiment, when the new content is displayed in the sliding area 1410, the executing module 1203 can mark the new content. Such marking can include displaying the new content with a second preset color (e.g., gray color).

In at least one exemplary embodiment, when the executing module 1203 has set the starting position for the major content, and the new content is slid out from the upper edge of the sliding area 1410 to the sliding area 1410 for display, the executing module 1203 can automatically cancel the starting position, and automatically delete the marking (e.g., the display in blue color) of the first icon 151. In at least one exemplary embodiment, after the starting position is canceled, and the executing module 1203 receives a signal that is generated by clicking the first icon 151, the executing module 1203 can add the new content to the major content, and set the upper boundary of the new content as the starting position of the major content. The executing module 1203 further displays the first icon 151 with the blue color.

Similarly, when the executing module 1203 has set the ending position for the major content, and new content is slid out from the lower edge of the sliding area 1410 to the sliding area 1410 for display, the executing module 1203 can automatically cancel the ending position, and can automatically delete the marking (e.g., the blue color) of the second icon 152. In at least one exemplary embodiment, after the ending position is canceled, and the executing module 1203 receives a signal that is generated by clicking the second icon 152, the executing module 1203 can add the new content to the major content, and set the lower boundary of the new content as the ending position of the major content. The executing module 1203 further displays the second icon 152 using the first preset color of blue.

Figure 6A:
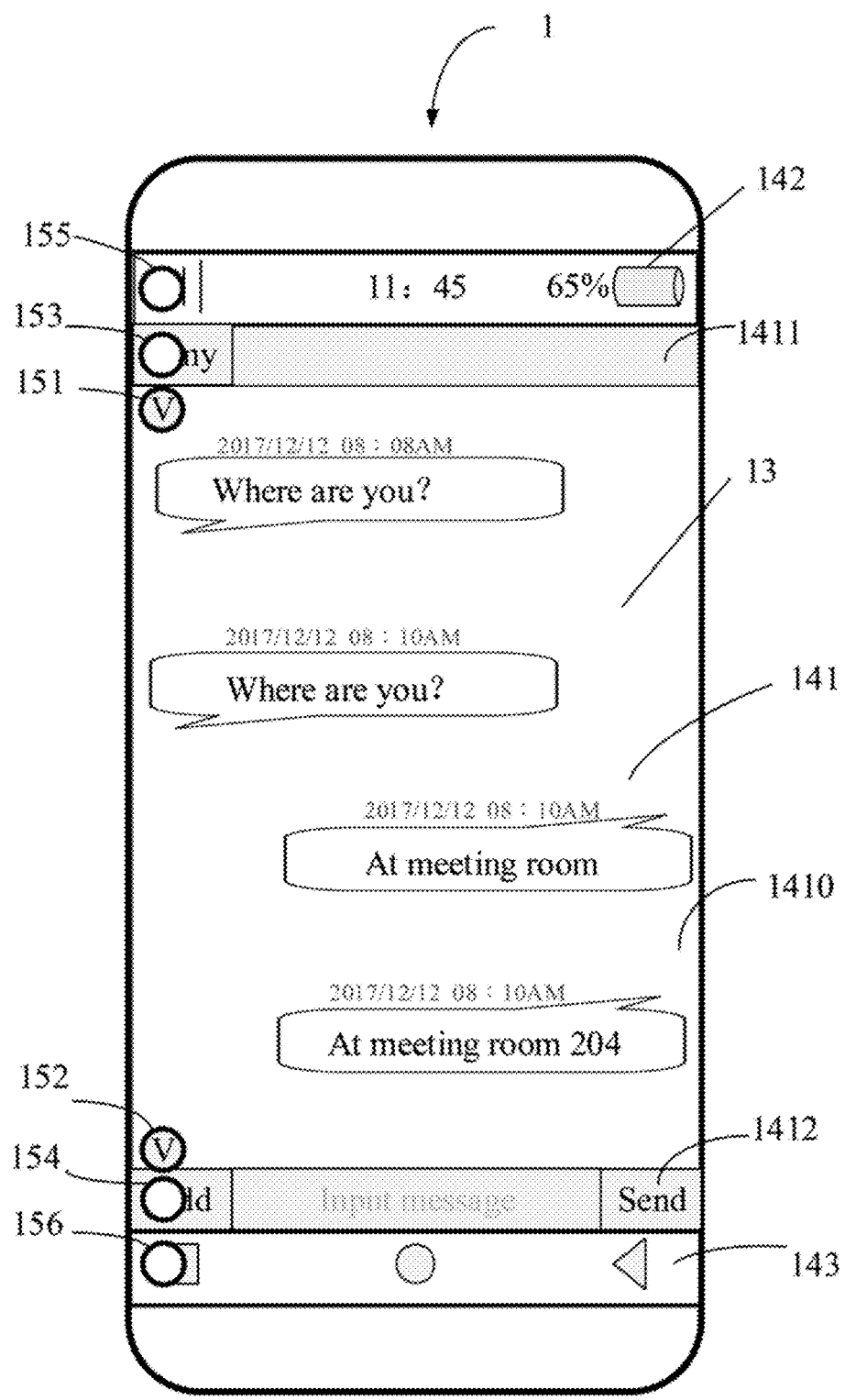
FIG. 6A illustrates an exemplary embodiment of the setting of a starting position and the setting of an ending position for capturing screen content.
Figure 6B:
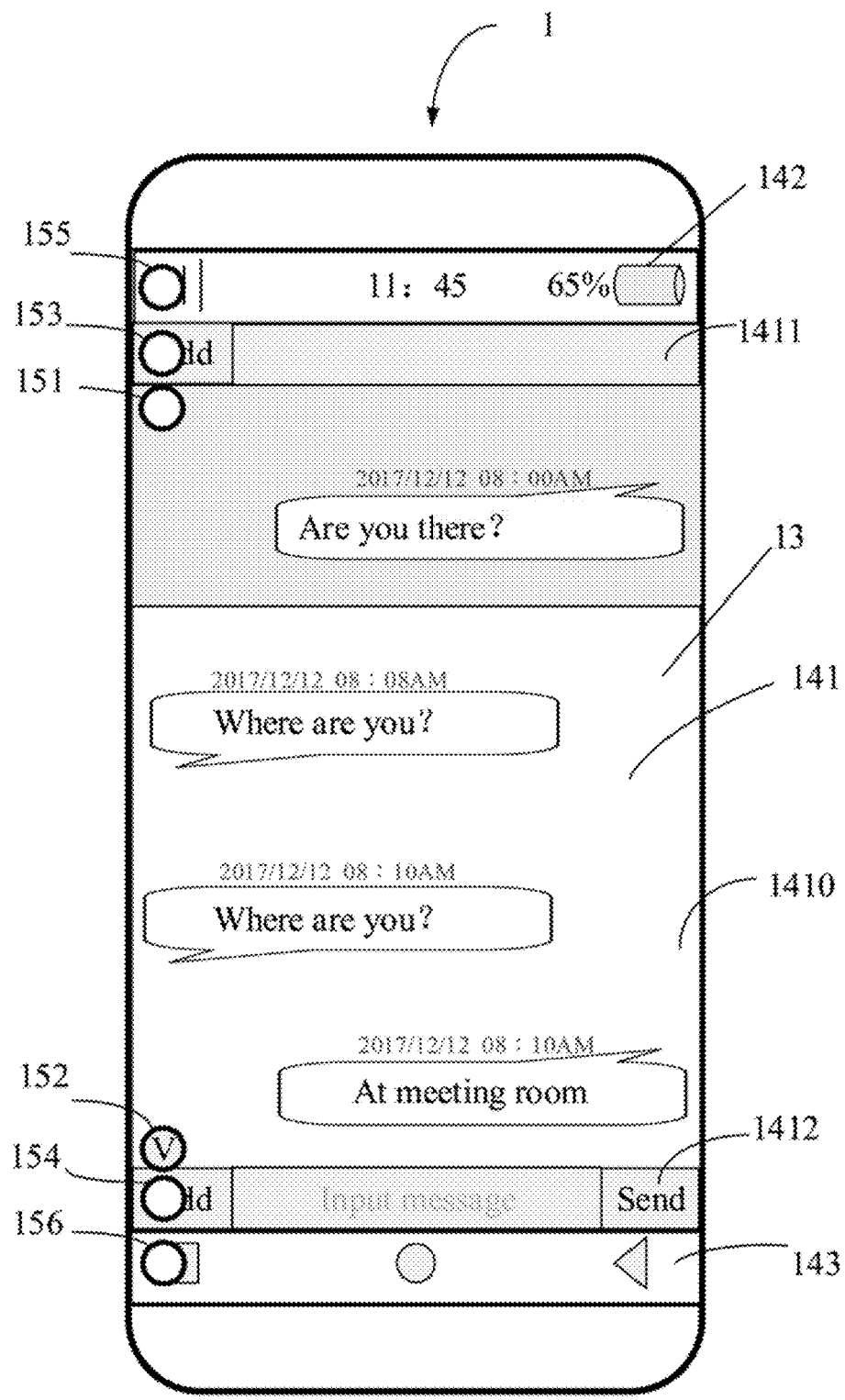
FIG. 6B illustrates an exemplary embodiment of the marking of new content.
Figure 6C:
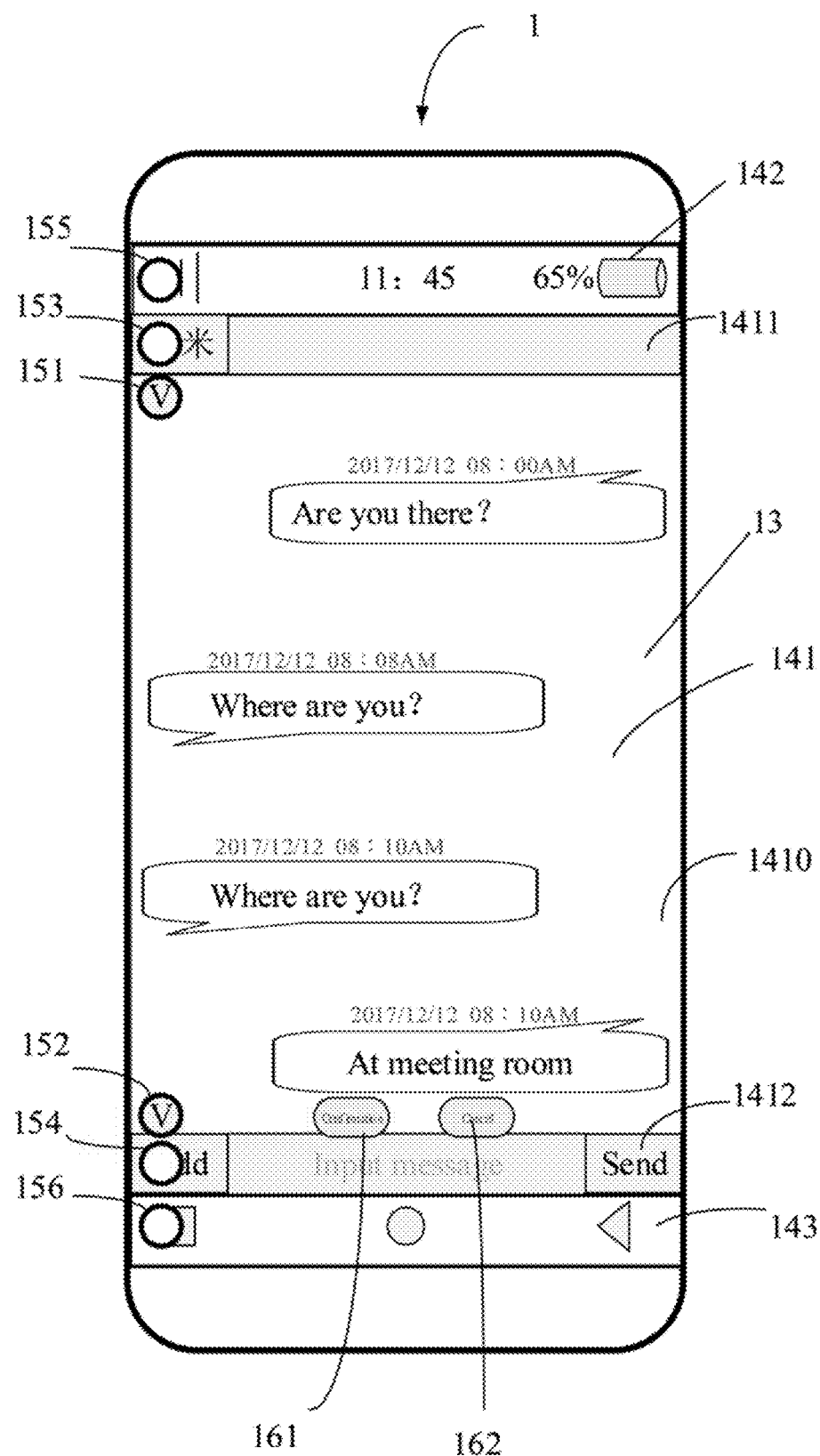
FIG. 6C illustrates an exemplary embodiment of the display of a confirmation button and a cancel button on the touch screen.

For example, as shown in FIG. 6A, it is assumed that the executing module 1203, according to the user input, sets the upper boundary of the sliding area 1410 as the starting position of the major content, and sets the lower boundary of the sliding area 1410 as the ending position of the major content. The executing module 1203 displays the first icon 151 and the second icon 152 using the first preset color. It is assumed that the user performs the operation of sliding downwards in the sliding area 1410, so the executing module 1203 can receive the sliding signal, and the executing module 1203 slides the content currently displayed in the sliding area 1410 downwards, and new content is slid out from the upper edge of the sliding area 1410 to the sliding area 1410 so as to be visible. Referring to FIG. 6B, then the executing module 1203 automatically cancels the starting position of the major content, and automatically deletes the marking (e.g., the blue color) of the first icon 151. The executing module 1203 can also display the new content using the second preset color, marking the new content using gray color. Referring to FIG. 6C, it is assumed that the user then clicks the first icon 151, then the executing module 1203 sets the upper boundary of the new content as the starting position of the major content, and adds the new content to the major content. In at least one exemplary embodiment, when the new content is added to the major content, the executing module 1203 can delete the marking of the new content, that is, no longer mark the new content using the second preset method.

It should be noted that, in other exemplary embodiments, when block S303 is executed, at block S304, the executing module 1203 can automatically set the upper edge of the sliding area 1410 as the starting position of the major content, and set the lower edge of the sliding are 1410 as ending position of the major content. In other words, the executing module 1203 sets the content currently displayed in the sliding area 1410 as the major content. The executing module 1203 further displays a confirmation button 161 and a cancel button 162.

At block S305, the executing module 1203 can determine whether a screenshot capturing operation should be performed based on user input.

It should be noted that the screenshot capturing operation triggers the electronic device to capture the current content of the touch screen 13.

In at least one exemplary embodiment, when the executing module 1203 has set the starting position and the ending position in the sliding area, the executing module 1203 can display the confirmation button 161 and the cancel button 162 on the touch screen 13. The executing module 1203 can determine whether the screenshot capturing operation should be performed according to signals that are generated by clicking the confirmation button 161 and the cancel button 162.

For example, as shown in FIG. 6C, when the user clicks the confirmation button 161, the executing module 1203 can receive a signal that is generated by clicking the conformation button 161. Then the executing module 1203 can determine that the screenshot capturing operation should be performed, and the process goes to block S306. When the user clicks the cancel button 162, the executing module 1203 can receive a signal that is generated by clicking the cancel button 162. Then the executing module 1203 can determine that the screenshot capturing operation should not be performed, and the process goes to block S307.

At block S306, the executing module 1203 can capture the major content by reading the content between the starting position and the ending position, and generating a first screenshot corresponding to the read content.

Figure 6D:
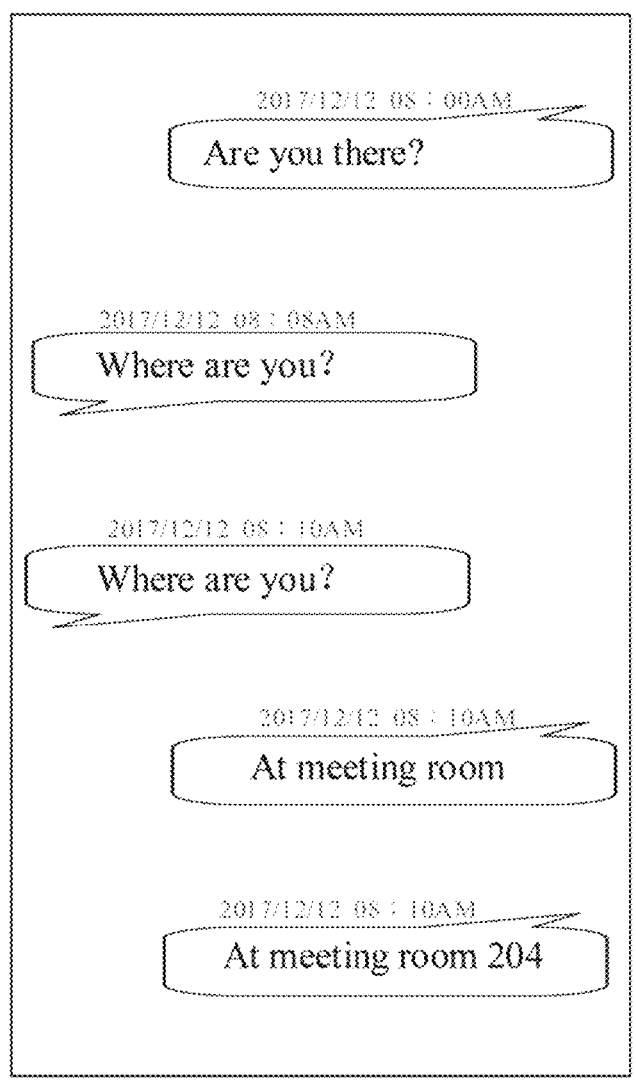
FIG. 6D illustrates an exemplary embodiment of the generation of a first screenshot according to content between the starting position and the ending position.

For example, as shown in FIG. 6C, when the new content is added to the major content, and the user touches the confirmation button 161, the executing module 1203 reads the content between the starting position and the ending position, and generates a first screenshot 17 corresponding to the read content (as shown in FIG. 6D).

Since the executing module 1203 can reset the starting position and the ending position of the major content when the user slides the content displayed in the sliding area 1410, a length of the first screenshot 17 can be larger or smaller than a distance between the upper edge and the lower edge of the sliding area 1410.

In at least one exemplary embodiment, at block S304, when the executing module 1203 further sets the additional content, the executing module 1203 can generate a second screenshot which uses the first screenshot together with the additional content based on a position of the additional content in relation to a position of the sliding area on the touch screen 13.

In at least one exemplary embodiment, when the position of the additional content on the touch screen 13 is located above the sliding area on the touch screen 13, the executing module 1203 can generate the second screenshot by stitching a lower edge of the additional content to a top edge of the first screenshot. When the position of the additional content on the touch screen 13 is located below the sliding area on the touch screen 13, the executing module 1203 can generate the second screenshot by stitching a top edge of the additional content to a lower edge of the first screenshot.

Figure 6E:
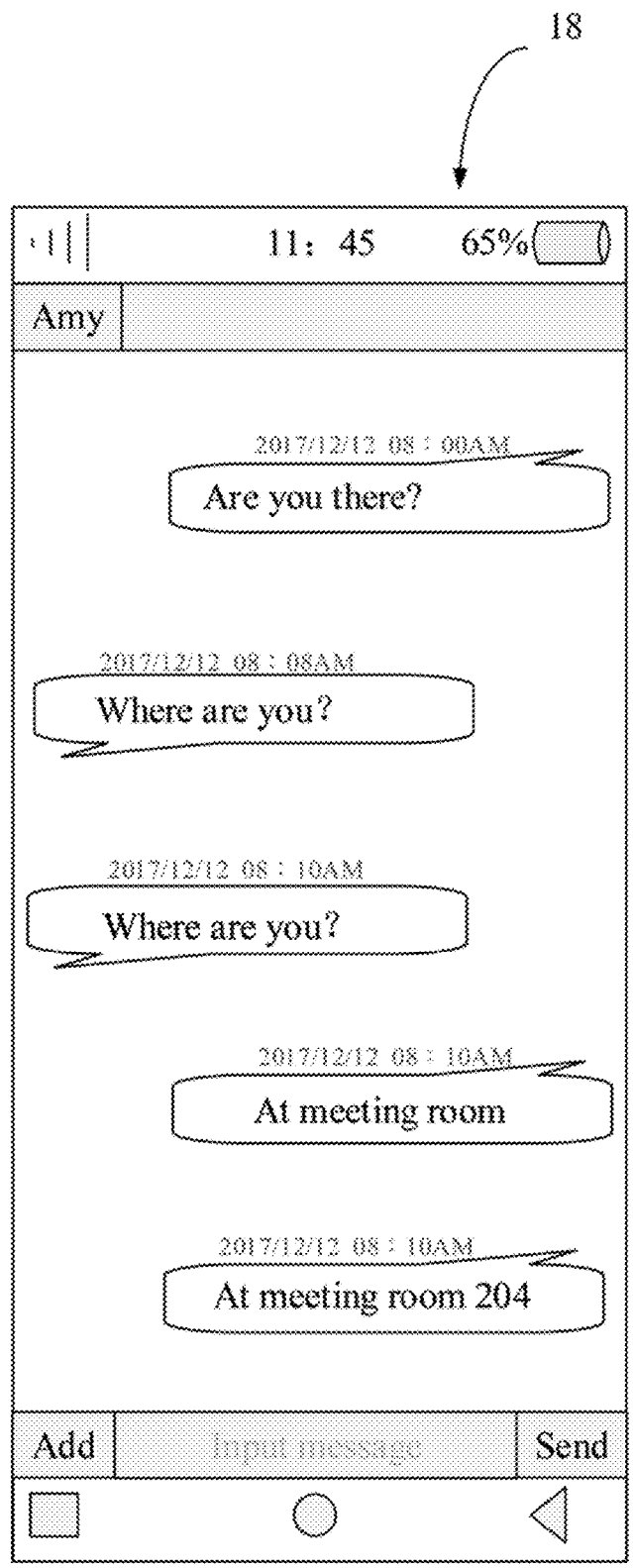
FIG. 6E illustrates an exemplary embodiment of the generation of a second screenshot according to the first screenshot and additional content.

FIG. 6C shows, at block S304, the user clicking the third icon 153, the fourth icon 154, the fifth icon 155, and the sixth icon 156, after new content is added to the major content. The executing module 1203 then sets the non-sliding areas 1411, the non-sliding areas 1412, the status bar 142, and the content corresponding to the navigation bar 143 as the additional content. When the user touches the confirmation button 161, the executing module 1203 first reads the content between the starting position and the ending position, and generates the first screenshot 17 corresponding to the read content. The executing module 1203 further generates a second screenshot using the first screenshot and additional content based on a positional of the additional content in relation to a position of the sliding area on the touch screen 13, as shown in FIG. 6E.

At block S307, when the executing module 1203 determines that the screenshot capturing operation should not be performed, the executing module 1203 cancels the starting position and the ending position of the major content.

For example, the executing module 1203 can restore the first icon 151 corresponding to the starting position to a state that is not clicked, and restore the second icon 152 corresponding to the ending position to a state that is not clicked.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A screenshot capturing method, applied to an electronic device, the method comprising:
    displaying a user interface of an application on a touch screen of the electronic device;
    dividing the user interface into a sliding area and N number of non-sliding areas when an operation that is applied to the electronic device is received, wherein N is an integer greater than zero;
    displaying icons for the sliding area, wherein the icons comprise a starting icon that is used to set a starting position in the sliding area, and an ending icon that is used to set an ending position in the sliding area;
    setting the starting position and the ending position in the sliding area;
    resetting the starting position and the ending position; and
    reading content between the starting position and the ending position, and generating a first screenshot according to the content;
    wherein the resetting of the starting position and the ending position comprises:
    canceling the starting position when new content is slid from an upper edge of the sliding area to the sliding area for display;
    setting an upper boundary of the new content as the starting position when a signal is generated by clicking the starting icon used to set the starting position is received;
    canceling the ending position when new content is slid from a lower edge of the sliding area to the sliding area for display;

setting a lower boundary of the new content slid from the lower edge of the sliding area to the sliding area as the ending position when a signal is generated by clicking the ending icon used to set the ending position is received.

2. The method according to claim 1, further comprising: determining a material not in the sliding area to be captured as additional content; and
generating a second screenshot according to the first screenshot and the additional content.

3. The method according to claim 2, wherein the additional content comprises at least one of the N number of non-sliding areas, a status bar, a navigation bar, or a combination thereof.

4. The method according to claim 3, wherein the second screenshot is generated based on a position of the additional content in relation to a position of the sliding area.

5. The method according to claim 4, wherein when the position of the additional content is located above the sliding area, the second screenshot is generated by stitching a lower edge of the additional content to a top edge of the first screenshot; when the position of the additional content is located below a lower edge of the sliding area, the second screenshot is generated by stitching a top edge of the additional content to a lower edge of the first screenshot.

6. The method according to claim 1, further comprising: displaying N number of icons for the non-sliding areas, wherein the N number of icons are used to determine whether material of the non-sliding areas should be set as additional content.

7. An electronic device comprising:
a storage device;
at least one processor; and
the storage device storing one or more programs, which when executed by the at least one processor, cause the at least one processor to:
display a user interface of an application on a touch screen of the electronic device;
divide, when a preset operation that is applied to the electronic device is received, the user interface into a sliding area and N number of non-sliding areas, wherein N is an integer greater than zero;
display icons for the sliding area, wherein the icons comprise a starting icon that is used to set a starting position in the sliding area, and an ending icon that is used to set an ending position in the sliding area;
set the starting position and the ending position in the sliding area;
reset the starting position and the ending position; and
read content between the starting position and the ending position, and generate a first screenshot according to the content;
wherein the resetting of the starting position and the ending position comprises:
canceling the starting position when new content is slid from an upper edge of the sliding area to the sliding area for display;
setting an upper boundary of the new content as the starting position when a signal is generated by clicking the starting icon used to set the starting position is received;
canceling the ending position when new content is slid from a lower edge of the sliding area to the sliding area for display;
setting a lower boundary of the new content slid from the lower edge of the sliding area to the sliding area as the ending position when a signal is generated by clicking the ending icon used to set the ending position is received.

8. The electronic device according to claim 7, wherein the at least one processor is further caused to:
determine a material not in the sliding area to be captured as additional content; and
generate a second screenshot according to the first screenshot and the additional content.

9. The electronic device according to claim 8, wherein the additional content comprises at least one of the N number of non-sliding areas, a status bar, a navigation bar, or a combination thereof.

10. The electronic device according to claim 9, wherein the second screenshot is generated based on a position of the additional content in relation to a position of the sliding area.

11. The electronic device according to claim 10, wherein when the position of the additional content is located above a top edge of the sliding area on the touch screen, the second screenshot is generated by stitching a lower edge of the additional content to a top edge of the first screenshot; when the position of the additional content is located below a lower edge of the sliding area on the touch screen, the second screenshot is generated by stitching a top edge of the additional content to a lower edge of the first screenshot.

12. The electronic device according to claim 7, wherein the at least one processor is further caused to:
display N number of icons for the non-sliding areas, wherein the N number of icons are used to determine whether material of the non-sliding areas should be set as additional content.

13. A non-transitory storage medium having instructions stored thereon, when the instructions are executed by a processor of an electronic device, the processor is configured to perform a screenshot capturing method, wherein the method comprises:
displaying a user interface of an application on a touch screen of the electronic device;
dividing the user interface into a sliding area and N number of non-sliding areas when an operation that is applied to the electronic device is received, wherein N is an integer greater than zero;
displaying icons for the sliding area, wherein the icons comprise a starting icon that is used to set a starting position in the sliding area, and an ending icon that is used to set an ending position in the sliding area;
setting the starting position and the ending position in the sliding area;
resetting the starting position and the ending position; and
reading content between the starting position and the ending position, and generating a first screenshot according to the content;
wherein the resetting of the starting position and the ending position comprises:
canceling the starting position when new content is slid from an upper edge of the sliding area to the sliding area for display;
setting an upper boundary of the new content as the starting position when a signal is generated by clicking the starting icon used to set the starting position is received;
canceling the ending position when new content is slid from a lower edge of the sliding area to the sliding area for display;
setting a lower boundary of the new content slid from the lower edge of the sliding area to the sliding area as the ending position when a signal is generated by clicking the ending icon used to set the ending position is received.

14. The non-transitory storage medium according to claim 13, wherein the method further comprises:
   determining a material not in the sliding area to be captured as additional content; and
   generating a second screenshot according to the first screenshot and the additional content.

15. The non-transitory storage medium according to claim 14, wherein the additional content comprises at least one of the N number of non-sliding areas, a status bar, a navigation bar, or a combination thereof.

16. The non-transitory storage medium according to claim 15, wherein the second screenshot is generated based on a position of the additional content in relation to a position of the sliding area, wherein when the position of the additional content is located above the sliding area, the second screenshot is generated by stitching a lower edge of the additional content to a top edge of the first screenshot; when the position of the additional content is located below a lower edge of the sliding area, the second screenshot is generated by stitching a top edge of the additional content to a lower edge of the first screenshot.

17. The non-transitory storage medium according to claim 13, wherein the method further comprises:
   displaying N number of icons for the non-sliding areas, wherein the N number of icons are used to determine whether material of the non-sliding areas should be set as additional content.

* * * * *